United States Patent
Tardif

(10) Patent No.: US 12,487,870 B2
(45) Date of Patent: Dec. 2, 2025

(54) SYSTEMS AND METHODS FOR MOVING DATA BETWEEN SYSTEM COMPONENTS

(71) Applicant: Microsoft Technology Licensing, LLC, Redmond, WA (US)

(72) Inventor: John A. Tardif, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 18/325,817

(22) Filed: May 30, 2023

(65) Prior Publication Data

US 2024/0403148 A1 Dec. 5, 2024

(51) Int. Cl.
| | |
|---|---|
| *G06F 9/54* | (2006.01) |
| *G06F 3/06* | (2006.01) |
| *G06F 9/34* | (2018.01) |

(52) U.S. Cl.
CPC ............ *G06F 9/544* (2013.01); *G06F 3/0659* (2013.01); *G06F 9/34* (2013.01)

(58) Field of Classification Search
CPC .......... G06F 9/544; G06F 9/34; G06F 13/102; G06F 13/28; G06F 3/0659; G06F 3/0613; G06F 3/064; G06F 3/0653; G06F 3/0679; H04L 49/901; H04L 49/90; H04L 69/32; H04L 12/40058
See application file for complete search history.

(56) References Cited

U.S. PATENT DOCUMENTS

| | | | |
|---|---|---|---|
| 2005/0097245 A1* | 5/2005 | Lym | ...................... H04L 49/901 710/52 |
| 2014/0229648 A1 | 8/2014 | Tsirkin | |
| 2015/0127866 A1 | 5/2015 | Zeng et al. | |
| 2018/0102173 A1 | 4/2018 | Fields, Jr. | |
| 2020/0125548 A1 | 4/2020 | Shergill | |

FOREIGN PATENT DOCUMENTS

| | | |
|---|---|---|
| EP | 1056016 A2 | 11/2000 |
| EP | 3255544 B1 | 7/2019 |

OTHER PUBLICATIONS

International Search Report and Written Opinion received for PCT Application No. PCT/US2024/030139, Sep. 9, 2024, 13 pages.
International Search Report and Written Opinion received for PCT Application No. PCT/US2024/030675, Jul. 30, 2024, 11 pages.

* cited by examiner

*Primary Examiner* — Ernest Unelus
(74) *Attorney, Agent, or Firm* — Seed Intellectual Property Law Group LLP

(57) ABSTRACT

Embodiments of the present disclosure include techniques for moving data between electronic system components using buffers. A digital processor stores data generated in response to a series of commands in a first buffer. Commands are received with a reference to a second buffer. The digital processor tracks the last location that a data result was stored in the first buffer. When a data result fills the buffer, the remaining data is automatically stored in the second buffer. Downstream devices may empty full buffers. A client may receive an indication that a buffer is empty and subsequently send commands with a reference to empty buffer.

20 Claims, 3 Drawing Sheets

| Command Size | 8192 | bytes | maximum command output data result size | | | | |
|---|---|---|---|---|---|---|---|
| Write Buffer Size | 65536 | bytes | buffer size | | | | |

| Remaining size of previous unfilled buffer | | 65535 | | | | | |
|---|---|---|---|---|---|---|---|
| Pointer offset into previous buffer | | 1 | | | | | |
| Need to supply 2 dest buffers for first command? | | No | | | | | |
| Total Max Commands in Batch | | 15 | Max number of cmds that fit in remaining old buffer plus new empty buffer | | | | |

| SubCommand in Batch | Dest Buf Addr | Dest Buf Size | ContWrBuffer | Output Bytes for Command | Buffer Used for Start | Buffer Start Offset | Buffer Used at End | Buffer End Offset |
|---|---|---|---|---|---|---|---|---|
| CMD 0 | Old, offset=1 | 65535 | 0 | 8038 | Old | 1 | Old | 8039 |
| CMD 1 | New, offset=0 | 65536 | 1 | 7941 | Old | 8039 | Old | 15980 |
| CMD 2 | New, offset=0 | 65536 | 1 | 5075 | Old | 15980 | Old | 21055 |
| CMD 3 | New, offset=0 | 65536 | 1 | 6833 | Old | 21055 | Old | 27888 |
| CMD 4 | New, offset=0 | 65536 | 1 | 3362 | Old | 27888 | Old | 31250 |
| CMD 5 | New, offset=0 | 65536 | 1 | 7954 | Old | 31250 | Old | 39204 |
| CMD 6 | New, offset=0 | 65536 | 1 | 4487 | Old | 39204 | Old | 43691 |
| CMD 7 | New, offset=0 | 65536 | 1 | 2421 | Old | 43691 | Old | 46112 |
| CMD 8 | New, offset=0 | 65536 | 1 | 3059 | Old | 46112 | Old | 49171 |
| CMD 9 | New, offset=0 | 65536 | 1 | 7317 | Old | 49171 | Old | 56488 |
| CMD 10 | New, offset=0 | 65536 | 1 | 5036 | Old | 56488 | Old | 61524 |
| CMD 11 | New, offset=0 | 65536 | 1 | 4230 | Old | 61524 | New | 218 |
| CMD 12 | New, offset=0 | 65536 | 1 | 4819 | New | 218 | New | 5037 |
| CMD 13 | New, offset=0 | 65536 | 1 | 5705 | New | 5037 | New | 10742 |
| CMD 14 | New, offset=0 | 65536 | 1 | 7912 | New | 10742 | New | 18654 |

*Fig. 4*

SYSTEMS AND METHODS FOR MOVING DATA BETWEEN SYSTEM COMPONENTS

BACKGROUND

The present disclosure relates generally to data handling in a digital system, and in particular, to systems and methods for moving data between system components.

With the ever increasing amount of data being processed by modern processors, data management and efficient handling are of growing importance. One common data movement artifact is a buffer. When a certain processing component of a digital system has completed a data processing task, it is common to store the results in a buffer. However, due to the limited size of buffers, steps must be taken when the buffer reaches capacity. Moving data out of a buffer, dealing with overflows, and managing buffer usage can reduce the efficiency of the system.

Such challenges apply particularly to accelerators, for example, which support direct client workload submissions via command queues for virtual function portals (i.e., SR-IOV) (e.g., Intel DSA and QAT, MS SDM and SDED). For workloads that have deterministic output size, one can support submission of many commands and execute them in parallel since the output destination addresses for each command can be calculated ahead of time. However, for workloads with indeterminate output size, like compression, one either has to wait for a previous command to complete, get the output size produced, and use that to issue the next command. Alternatively, one can issue many commands in parallel to execute into side buffers, but then a second process is needed to copy those outputs into a packed destination buffer. Both of these techniques require more latency and/or more system resources.

The following disclosure includes improved techniques for addressing these and other issues.

BRIEF DESCRIPTION OF THE DRAWINGS

FIG. 4 illustrates example commands, data results, and buffers according to an embodiment.

DETAILED DESCRIPTION

Described herein are techniques for moving data between components of a system. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Features and advantages of the present disclosure include a mechanism where an accelerator or other digital processor can continue processing commands where a previous command has ended without incurring the latency of completion and submission latencies to/from a client process. This may be referred to as write buffer continuation.

Embodiments of the disclosure may include ordering outputs such that a next output is not started until a previous output has completed, for example. In some applications, the ordering may occur per stream supported. Ordering is an issue when one has outputs that are dependent on previous outputs, such as when the previous outputs ended so that the next outputs can be placed consecutively into a buffer. However, while outputs may be ordered, the input and computational processing of the workloads can begin in parallel (or even out of order) in order to absorb as much latency as possible and maximize performance.

Figure 1:
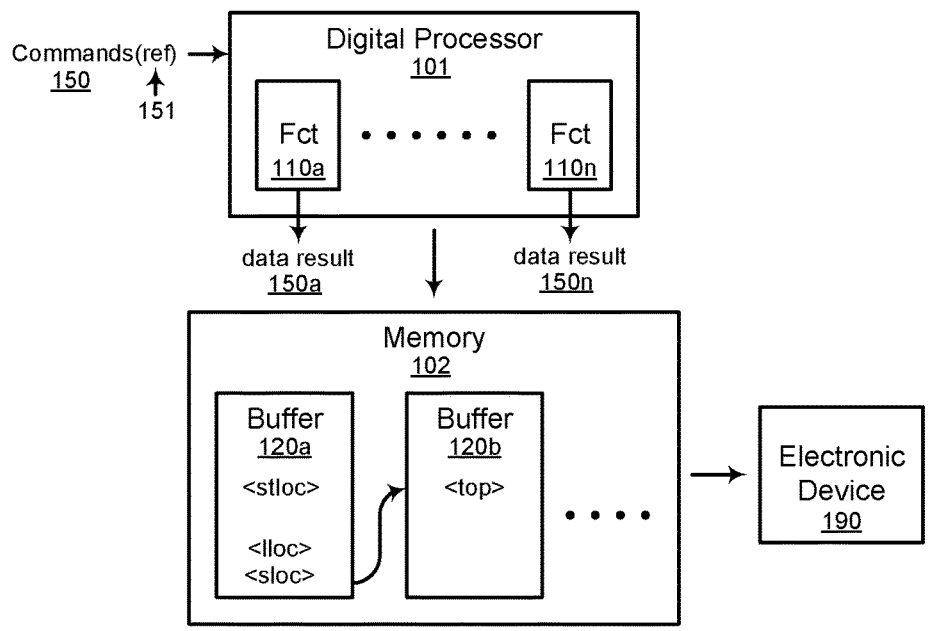
FIG. 1 illustrates an example system moving data according to an embodiment.

FIG. 1 illustrates an example system moving data according to an embodiment. A digital processor 101 receives a plurality of commands 150. Commands 150 may cause the digital processor 101 to perform a same processing function (e.g., using functional processing blocks 110a-n) to produce a plurality of data results 150a-n, for example. Example digital processors 101 include a variety of accelerators, which are hardware devices configured to enhance the overall performance of a computer or system. There are various types of accelerators available to help with enhancing the performance of different aspects of a computer's function, such as compression or artificial intelligence accelerators, for example. Features and advantages of the present disclosure include sending a plurality of commands 150 to processor 101 for execution serially. In some embodiments, commands may be sent in batches without waiting for each command to complete its processing function before the next command is issued, for example. Accordingly, execution of commands 150 causes digital processor 101 to produce a plurality of data results 150a-n. Data results 150a-n may be non-deterministic. For example, the output data size of each data result may be unknown in advance, thus creating a challenge for managing the storage of the data results 150a-n.

Digital processor 101 may store data results 150a-n in a plurality of buffers 120a-b in memory 102. Memory 102 may be main memory, for example, such as one or more dynamic random access memory integrated circuits (DRAM ICs). Advantageously, the system may track certain aspects of where data is stored in the buffers and provide auto-overflow features so that data results generated by a command are automatically stored in a buffer location (e.g., an address) following the last address used by data results from a previous command. When data results for a command fill a buffer, the data results automatically are stored in the next buffer. For example, digital processor 101 initially store data results 150a generated in response to a command in buffer 120a beginning at a starting location (<stloc>). Data results 150a may be stored between <stloc> at an end (or last) location (<lloc>). Digital processor 101 may track a last location <lloc> within the first buffer of a particular data result. Next, subsequent data results generated in response to a subsequent command are stored at a subsequent location (<sloc>) to the last location <lloc> within buffer 120a. However, a subsequent data result may fill buffer 120a. Advantageously, commands may be associated with a reference ("ref") 151 to the second buffer 120b. Accordingly, when a data result fills the first buffer 120a, a remainder of the data result causing the overflow is automatically stored in the second buffer 120b using the reference (e.g., automatic overflow of data into the next buffer). In this example, the remainder of the data result causing the overflow is stored in buffer 120b starting at an initial address for buffer 120b (e.g., the top of the buffer, <top>, assuming the buffer has been completely flushed prior to use as an overflow. Thereafter, a plurality of subsequent data results after the first data result are stored sequentially in buffer 120*b*. Once the overflow occurs, commands 150 received may update the reference to yet another overflow buffer, for example. Accordingly, at least a portion of the commands received by digital processor 101 are stored in one buffer (e.g., buffer 120*a*) but reference a different buffer for automated overflow purposes.

In some cases, commands may be received when buffer 120*a* is empty (e.g., it has been flushed as described in more detail below). When a first command is received it may be associated with a start location in the first buffer. Accordingly, a first entry in a data result corresponding to the first command may be stored at the starting address in the buffer (e.g., <top> of buffer 120*a*).

Using the techniques described above, output data generated serially by a series of commands by functional processing blocks 110*a-n* may be efficiently stored in a plurality of buffers without delays caused by buffers filling up, and associated command submission and command completion latencies which prevent the accelerator from achieving maximum performance. Once the data is in the buffers, other system components may retrieve the data for a variety of uses as described in more detail below. For example, an electronic device 190 may be coupled to the memory 102. Electronic device 190 may be a hard drive, processor, or an accelerator, for example. Electronic device 190 retrieves data results stored in the first buffer when the first data result of the plurality of data results fills the first buffer. As described in more detail below, the electronic device may send a signal indicating that the buffer has been emptied (aka flushed) so that the original buffer may be used as an overflow for data results. Accordingly, a first buffer is used to store data results and a second buffer may act as an overflow buffer. When the first buffer is filled, it may be flushed and used as an overflow buffer for the buffer current receiving and storing data. In various embodiments, different numbers of buffers may be used. In some cases, two buffers may be used, and in other cases three or more buffers may be used to store data from a digital processor generating multiple streams of output data, for example.

Figure 2:
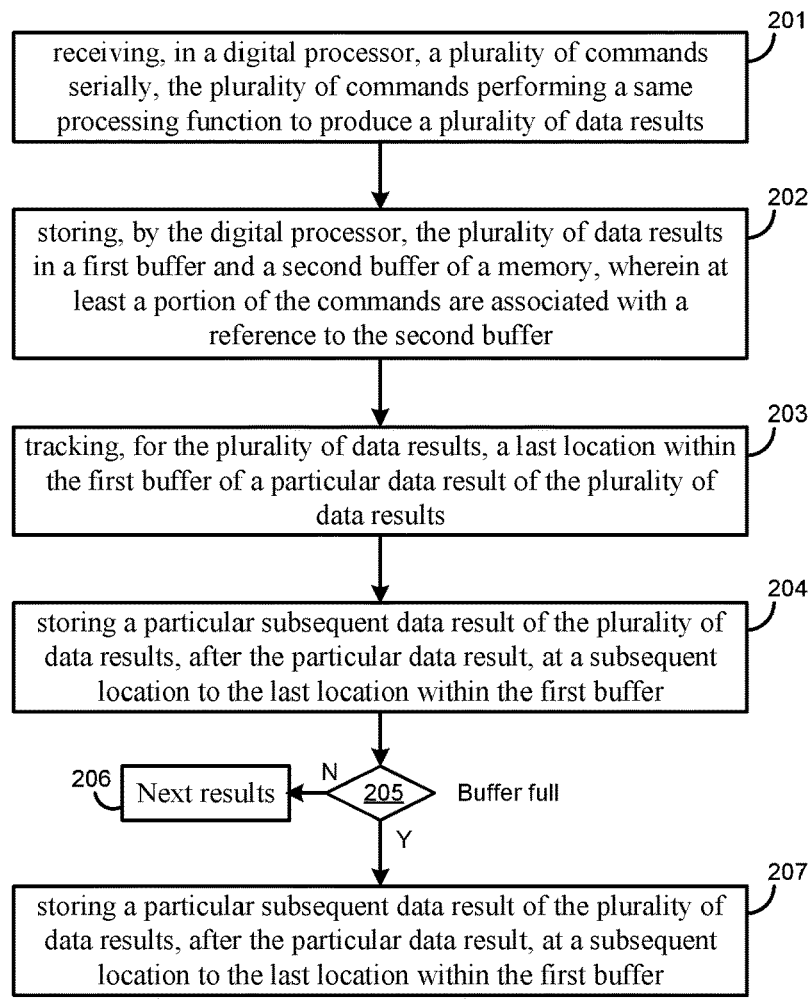
FIG. 2 illustrates a method of moving data according to an embodiment.

FIG. 2 illustrates a method of moving data according to an embodiment. At 201, commands are received serially in a digital processor, such as an accelerator, for example. The plurality of commands may perform the same processing function to produce a plurality of data results. At 202, the digital processor stores the plurality of data results in a first buffer and a second buffer of a memory. At least a portion of the commands are associated with a reference to the second buffer, for example, and are loaded into the first buffer. At 203, a last location within the first buffer of a particular data result is tracked. At 204, a particular subsequent data result is stored, after the previous data result, at a subsequent location to the last location within the first buffer. At 205, the system may detect that the first buffer is full. When a first data result of the plurality of data results fills the first buffer, a remainder of the first data result and a plurality of subsequent data results after the first data result are automatically stored, at 207, in the second buffer using the reference. If the first buffer is not full, then the results continue to be stored in the first buffer and the last location is saved for the next set of data results.

Figure 3:
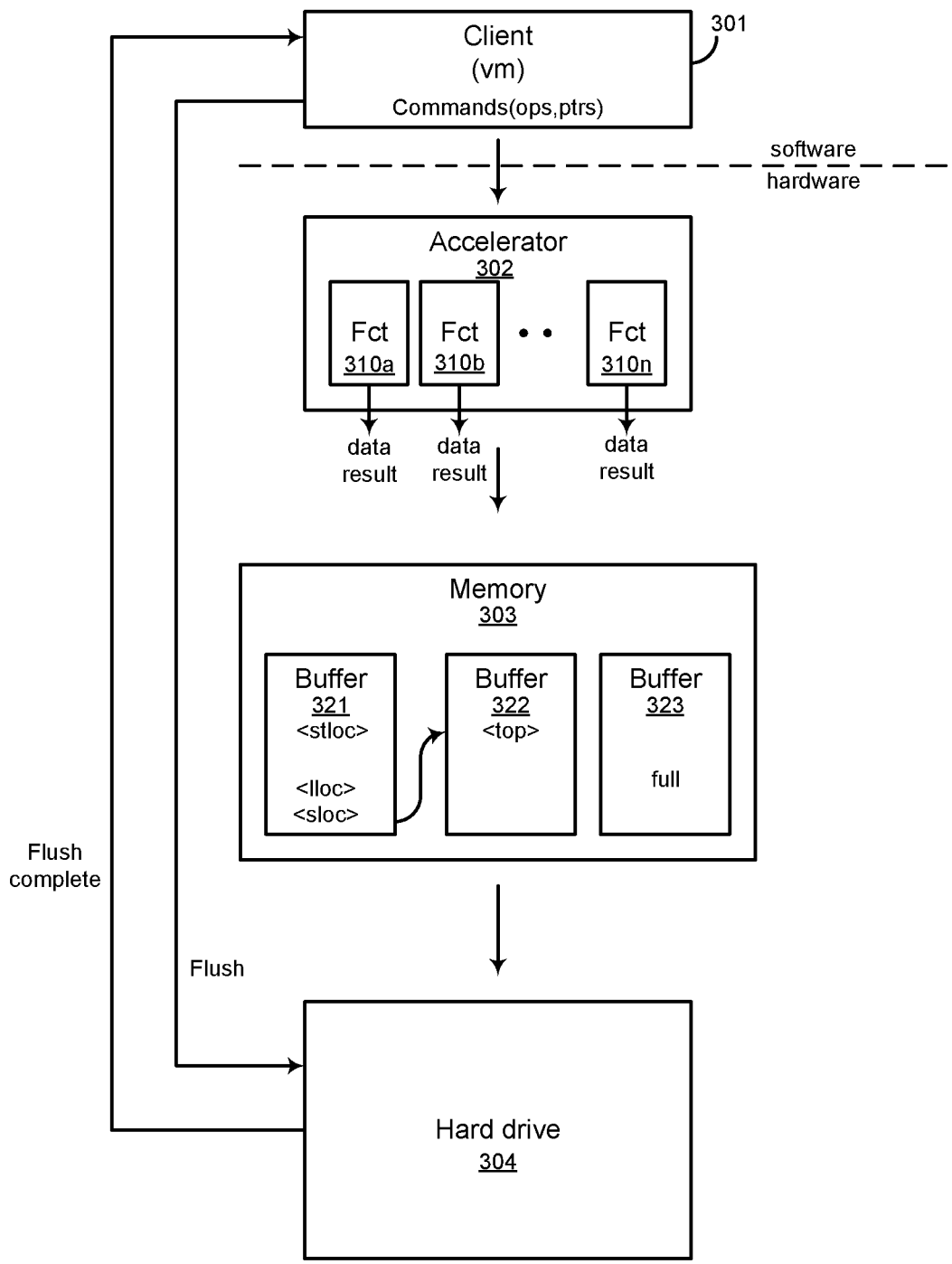
FIG. 3 illustrates an example system of moving data between an accelerator and a disk according to an embodiment.

FIG. 3 illustrates an example system of moving data between an accelerator 302 and a disk 304 according to an embodiment. In this example, commands are generated by a software client 301, which may be a virtual machine, for example. However, in other embodiments, command submission can be performed by other accelerators, which can include hardware components, for example. The commands, when issued by software client 201, may include operation codes and pointers, for example, where a pointer may point to the buffer to use as the overflow buffer. The pointer may be used as the reference mentioned above, for example. Advantageously, a stream of commands may be automatically issued from software client 301 to accelerator 302 to produce the plurality of data results that are stored buffers 321-323 without waiting, in the software client, for an indication that the commands are done executing. For instance, client 301 may start issuing commands serially. A first command may be received by accelerator 302 and executed in functional block 310*a* (e.g., a compression circuit). The next command may be received by accelerator 302 and executed in functional block 310*b* before functional block 310*a* has completed processing the first command. Commands are thusly sent to accelerator 302 and processed in parallel, at least partially, in functional blocks 310*a-n*, for example. The first command may include a reference to buffer 321, where the output data generated in response to the command is to be stored. However, subsequent commands may include a referent to buffer 322, which acts as the overflow buffer.

Functional block 310*a* may be the first to output a data result. As mentioned above, the first command is received with a reference to buffer 321, which specifies the location where the data result for the first command is to be stored. The first command may also be associated with a starting location <stloc> (e.g., the starting address in buffer 321 to store the data result). Accordingly, the first command stores entries in the data result starting at the first address in buffer 321 (e.g., the <top>). The last location <lloc> (e.g., the last address) where the last entry of the data result was stored may be tracked by accelerator 302. Accordingly, when the output data result for functional block 310*b* is available, it can be stored starting at the next address in buffer 321 after <lloc>. Functional blocks 310*b-n* will continue to store data results in buffer 321 starting at the address after the last address of the previous result and tracking the last address for each data result. However, when a data result for a particular command fills the buffer, the reference received with the command is used to automatically stop storing entries for the data results in buffer 321 and start storing remaining entries for the data results in the buffer specified by the reference (here, buffer 322).

As mentioned above, in some cases output data results are non-deterministic (e.g., the size of the data results to be stored in each buffer may not be the same and may not be known). Using the present technique of tracking the last location and automatically filling the next buffer when the current buffer is full allows the system to efficiently store non-deterministic data results without additional memory management overhead and/or delays caused by interactions with the client to manage the buffers, for example. In particular, various embodiments may not need to wait for completion notifications indicating output data result sizes or buffer status after each command is issued. Additionally, various embodiments may not need to allocate separate output spaces for data results generated for each command.

In some embodiments, memory 303 further comprises a third buffer 323. Accordingly, when a data result fills one buffer, an electronic device may retrieve data results stored in the one buffer while the accelerator stores data results in other buffers. In this example, data results from accelerator 302 are stored in memory 303, and three buffers 321-323 are accessed by a hard drive 304. For example, while data generated by commands are loaded into buffers 321 and 322, hard drive 304 may empty a previously filled buffer 323. Client 301 may send a signal to hard drive 304 indicating that buffer 323 is full and ready to be flushed ("Flush"). In response to the signal, hard drive 304 may begin retrieving data from buffer 323 while buffers 321 and 322 are being filled. When hard drive 304 is done, and buffer 323 is empty, hard drive 304 may send a signal indicating that the buffer is empty ("Flush complete"). Accordingly, buffer 232 may be available for use as an overflow buffer. In particular, if buffer 321 is full, and data is being stored in buffer 322, when the "Flush complete" signal is received, subsequent commands may be issued with a reference to buffer 323, which becomes the overflow buffer for buffer 322, for example. Accordingly, data is stored sequentially across multiple buffers, where at least one buffer is used as the starting buffer, a reference is included in commands pointing to the overflow buffer, and a downstream device empties a buffer that has been previously filled.

FIG. 4 illustrates example commands, data results, and buffers according to an embodiment. In some embodiments, a client may determine a number of commands to be issued in a batch. In this example, a buffer size is 65536 bytes, and the maximum data result for a command is 8129 bytes. The remaining size of the buffer is 65536 bytes and the pointer offset into the buffer is 1 (e.g., <top> address: the buffer is empty). Based on this information, the client calculates that the number of commands that can fit into the current buffer and the overflow buffer is 15. The 15 commands (CMD 0 . . . . CMD 14) are shown in the table. The commands are sent by the client with a destination buffer address (Dest Buf Addr), destination buffer size (Dest Buf Size), and continue write buffer (ContWrBuffer). Destination buffer address indicates the buffer to store a commands output data in. ContWrBuffer is the bit in the command descriptor that is set to indicate whether the command should continue using the previous write buffer (ContWrBuffer=1), or whether it should use the supplied write buffer in the command descriptor explicitly (ContWrBuffer=0).

Example output bytes for each command are shown. The output bytes are randomly generated in this example to illustrate the non-deterministic size of the output data. As illustrated here, commands CMD 0 through CMD 10 are stored in the initial buffer. However, CMD 11 starts at address 61524 with a 4230 byte output. This causes the initial buffer to be filled, and the system automatically starts filling the new buffer. After CMD 11 output data has been stored, the last address is 218. An accelerator or other digital system tracks the buffer end offset (last column of the table).

The first command, CMD 0, stores data in the initial buffer (Old), while all the following commands store data in the initial buffer until full, and then use the overflow buffer (New). For the first command in the sequence, the write buffer starting address (offset included) and the remaining size are provided. The overflow buffer is presented in subsequent command descriptors with the starting address (base address of the buffer) and the total size of the buffer. If the initial buffer were partially full, an offset for the first command would be the last address before the empty part of the buffer (e.g., 12000). In this case, an accelerator may receive the offset and update buffer start and end offsets.

FURTHER EXAMPLES

Each of the following non-limiting features in the following examples may stand on its own or may be combined in various permutations or combinations with one or more of the other features in the examples below: In various embodiments, the present disclosure may be implemented as a system or method.

In one embodiment, the present disclosure includes a system comprising: a digital processor, wherein the digital processor receives a plurality of commands serially, the plurality of commands performing a same processing function to produce a plurality of data results: memory comprising at least at least a first buffer and a second buffer; and wherein the digital processor stores the plurality of data results in the first buffer and the second buffer, wherein, for the plurality of data results, the digital processor tracks a last location within the first buffer of a particular data result of the plurality of data results, wherein a particular subsequent data result of the plurality of data results, after the particular data result, is stored at a subsequent location to the last location within the first buffer, and wherein at least a portion of the commands are associated with a reference to the second buffer, and when a first data result of the plurality of data results fills the first buffer, a remainder of the first data result and a plurality of subsequent data results after the first data result are automatically stored in the second buffer using the reference.

In one embodiment, the present disclosure includes a method of moving data comprising: receiving, in a digital processor, a plurality of commands serially, the plurality of commands performing a same processing function to produce a plurality of data results; storing, by the digital processor, the plurality of data results in a first buffer and a second buffer of a memory, wherein at least a portion of the commands are associated with a reference to the second buffer: tracking, for the plurality of data results, a last location within the first buffer of a particular data result of the plurality of data results: storing a particular subsequent data result of the plurality of data results, after the particular data result, at a subsequent location to the last location within the first buffer; and when a first data result of the plurality of data results fills the first buffer, automatically storing a remainder of the first data result and a plurality of subsequent data results after the first data result in the second buffer using the reference.

In one embodiment, one of the commands is a first command of the plurality of commands, and wherein the first command is associated with a start location in the first buffer, and wherein a first entry in a data result corresponding to the first command is stored at the starting address in the buffer.

In one embodiment, the commands are generated by a software client or another digital processor.

In one embodiment, the commands, when issued by the software client, are associated with a reference to the second buffer and the digital processor stores at least a portion of the plurality of data results in the first buffer.

In one embodiment, the software client is a virtual machine.

In one embodiment, the commands are automatically issued from the software client to the digital processor to produce the plurality of data results stored in the first and second buffers without waiting, in the software client, for an indication that the commands are done executing.

In one embodiment, the digital processor is an accelerator producing a non-deterministic output size.

In one embodiment, the accelerator is one of: a data compression circuit, an artificial intelligence (AI) accelerator circuit.

In one embodiment, the system further comprises an electronic device coupled to the memory, the electronic device retrieving data results stored in the first buffer when the first data result of the plurality of data results fills the first buffer.

In one embodiment, the first electronic device is a hard drive or another processor.

In one embodiment, the memory further comprising a third buffer, wherein when the first data result of the plurality of data results fills the first buffer, the electronic device retrieves data results stored in the first buffer while the digital processor stores the plurality of data results in the second buffer and the third buffer.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A system comprising:
a digital processor, wherein the digital processor receives a plurality of commands serially, the plurality of commands performing a same processing function to produce a plurality of data results;
memory comprising at least at least a first buffer and a second buffer; and
wherein the digital processor stores the plurality of data results in the first buffer and the second buffer,
wherein, for the plurality of data results, the digital processor tracks a last location within the first buffer of a particular data result of the plurality of data results,
wherein a particular subsequent data result of the plurality of data results, after the particular data result, is stored at a subsequent location to the last location within the first buffer, and
wherein a portion of the commands are associated with a reference to the second buffer, and when a first data result of the plurality of data results fills the first buffer, a remainder of the first data result and a plurality of subsequent data results after the first data result are automatically stored in the second buffer using the reference, wherein the portion of the commands is less than all of the commands.

2. The system of claim 1, wherein one of the commands is a first command of the plurality of commands, and wherein the first command is associated with a start location in the first buffer, and wherein a first entry in a data result corresponding to the first command is stored at the starting address in the buffer.

3. The system of claim 1, wherein the commands are generated by a software client or another digital processor.

4. The system of claim 3, wherein the commands, when issued by the software client, are associated with a reference to the second buffer and the digital processor stores at least a portion of the plurality of data results in the first buffer.

5. The system of claim 3, wherein the software client is a virtual machine.

6. The system of claim 3, wherein the commands are automatically issued from the software client to the digital processor to produce the plurality of data results stored in the first and second buffers without waiting, in the software client, for an indication that the commands are done executing.

7. The system of claim 1, wherein the digital processor is an accelerator producing a non-deterministic output size.

8. The system of claim 7, wherein the accelerator is one of: a data compression circuit, an artificial intelligence (AI) accelerator circuit.

9. The system of claim 1, further comprising an electronic device coupled to the memory, the electronic device retrieving data results stored in the first buffer when the first data result of the plurality of data results fills the first buffer.

10. The system of claim 9, wherein the first electronic device is a hard drive or another processor.

11. The system of claim 9, the memory further comprising a third buffer, wherein when the first data result of the plurality of data results fills the first buffer, the electronic device retrieves data results stored in the first buffer while the digital processor stores the plurality of data results in the second buffer and the third buffer.

12. A method of moving data comprising:
receiving, in a digital processor, a plurality of commands serially, the plurality of commands performing a same processing function to produce a plurality of data results;
storing, by the digital processor, the plurality of data results in a first buffer and a second buffer of a memory, wherein a portion of the commands are associated with a reference to the second buffer, wherein the portion of the commands is less than all of the commands;
tracking, for the plurality of data results, a last location within the first buffer of a particular data result of the plurality of data results;
storing a particular subsequent data result of the plurality of data results, after the particular data result, at a subsequent location to the last location within the first buffer; and
when a first data result of the plurality of data results fills the first buffer, automatically storing a remainder of the first data result and a plurality of subsequent data results after the first data result in the second buffer using the reference.

13. The method of claim 12, wherein one of the commands is a first command of the plurality of commands, and wherein the first command is associated with a start location in the first buffer, and wherein a first entry in a data result corresponding to the first command is stored at the starting address in the buffer.

14. The method of claim 12, wherein the commands are generated by a software client.

15. The method of claim 14, wherein the commands, when issued by the software client, are associated with a reference to the second buffer and the digital processor stores at least a portion of the plurality of data results in the first buffer.

16. The method of claim 14, wherein the software client is a virtual machine.

17. The method of claim 14, wherein the commands are automatically issued from the software client to the digital processor to produce the plurality of data results stored in the first and second buffers without waiting, in the software client, for an indication that the commands are done executing.

18. The method of claim 12, further comprising an electronic device coupled to the memory, the electronic device retrieving data results stored in the first buffer when the first data result of the plurality of data results fills the first buffer.

19. The method of claim 18, wherein the first electronic device is a hard drive or another processor.

20. The method of claim 19, the memory further comprising a third buffer, wherein when the first data result of the plurality of data results fills the first buffer, the electronic device retrieves data results stored in the first buffer while the digital processor stores the plurality of data results in the second buffer and the third buffer.

\* \* \* \* \*